Aug. 22, 1933.    G. A. LYON    1,924,085
COVER FOR SPARE TIRES OF AUTOMOBILES
Filed April 9, 1930
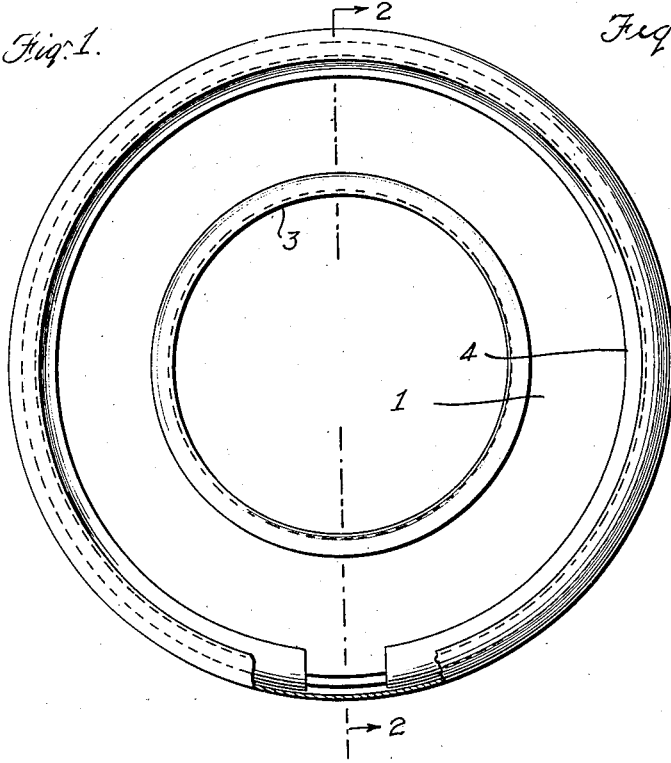
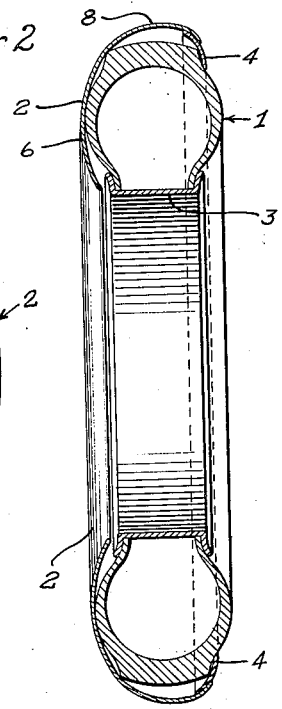
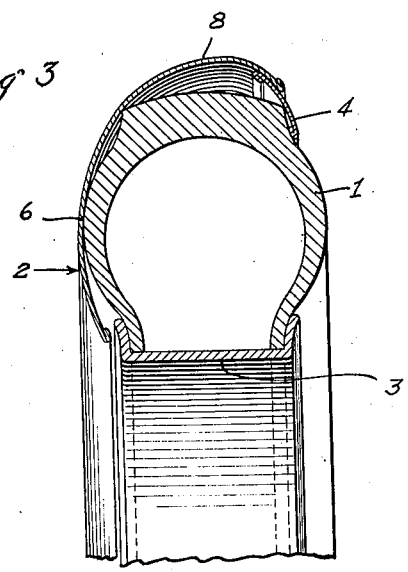
INVENTOR
G. ALBERT LYON
BY
Newell + Spencer
ATTORNEYS Patented Aug. 22, 1933

1,924,085

UNITED STATES PATENT OFFICE 1,924,085

COVER FOR SPARE TIRES OF AUTOMOBILES

George Albert Lyon, Allenhurst, N. J., assignor to Lyon Incorporated, Asbury Park, N. J., a Corporation of Delaware Application April 9, 1930. Serial No. 442,750

14 Claims. (Cl. 150—54)

This invention relates to covers for the spare tires of automobiles.

The principal objects of the present invention are to improve the construction and mode of operation of covers for the spare tires of automobiles and to produce a cover for spare tires which is highly attractive in appearance, which may be quickly and easily applied to and removed from the tire, which will furnish a satisfactory protection for the tire, and which is simple in construction and may be manufactured at a relatively low cost.

With these and other objects in view the invention consists in a tire cover embodying the novel and improved features and constructions of parts hereinafter described and particularly pointed out in the claims the advantages of which will be readily understood and appreciated by those skilled in the art.

The invention will be clearly understood from the accompanying drawing illustrating the invention in its preferred form and the following detailed description of the constructions therein shown.

In the drawing:

Fig. 1 is a view in side elevation partly broken away and partly in section, illustrating a tire cover embodying the invention applied to a tire;

Fig. 2 is a sectional view taken substantially on the line 2—2 of Fig. 1; and

Fig. 3 is a detailed sectional view taken substantially on the same plane as Fig. 2 and illustrating the parts on an enlarged scale.

In the drawing, the cover is illustrated as applied to a tire 1 supported on a demountable rim 3. In the construction shown in the drawing, the tire cover comprises a cover member 2 made of sheet metal or other relatively stiff sheet material and formed to cover a side wall of a tire and to extend transversely across the tread and circumferentially about the same and a retaining ring 4 of similar material for engaging between the member 2 and the tire to hold the tire cover in position on the tire. The member 2 preferably has the form in cross-section shown in Figs. 2 and 3. As shown in these figures, said member is formed with a side wall 6 for covering one side of a tire and with a peripheral wall 8 arranged to extend laterally from said side wall 6 substantially across the peripheral or tread portion of the tire. The side wall 6 of the member 2 is preferably given a recessed form in cross-section on the inside thereof to receive the side wall of the tire, and, as shown, is curved in concavo-convex form to conform generally to the convex shape of the side wall of the tire. The peripheral wall 8 of the cover member 2 extends from the side wall 6 laterally across the tread portion of the tire and outwardly away from the tread of the tire to the points at which it has its maximum diameter. From these points the said wall extends laterally and inwardly toward the tread of the tire at a comparatively sharp angle. The member 2 is shown as made in ring form and preferably consists of a continuous ring formed to extend completely about the tire. The wall 6, however, may be extended inwardly to the axis of the tire if it is desired to cover the space within the rim.

The wall 8 of the member 2 is constructed with an inside diameter at its margin remote from the wall 6 at least slightly greater than the maximum diameter of the tire to enable said member to be passed laterally over the tire in applying the same to and removing the same from a tire. The member 2 is applied to a tire with the side wall 6 thereof engaging a side surface of the tire and with the peripheral wall 8 extending transversely across and peripherally about the tread surface of the tire. In the particular form of the invention shown in the drawing, the side wall 6 of the member 2 engages the high point in the bulge in the side wall of the tire and said member also engages the shoulder on the tire formed at the juncture of the side surface of the tire and the tread surface thereof. When the member 2 is thus positioned, a space is left between the free margin of the peripheral wall 8 of said member and the adjacent portion of the tread of the tire.

In order to hold the member 2 in position on the tire, the ring 4 is inserted between the free margin of the wall 8 of said member and the tire. This ring preferably consists of sheet metal or other relatively stiff resilient sheet material and is preferably divided or split at one point to enable the same readily to expand and contract. This ring preferably has a slightly recessed form in cross-section on the inside thereof so that it will fit over the shoulder between the tread and the side wall of the tire, and the outer margin thereof is preferably inclined to the central plane of the tire at substantially the same angle as the adjacent free margin of the wall 8 of the member 2. As shown clearly in Fig. 3, the ring is given the slightly concavo-convex form in cross-section, and the ring is adapted to fit over the shoulder of the tire with the inner margin of the ring extending inwardly over the side wall of the tire, and the outer margin of the ring is adapted to fit within the inwardly inclined free margin of the wall 8.

As above stated, the retaining ring 4 is made of relatively stiff resilient material such as sheet-metal, and the ring is given a normal diameter somewhat greater than the interior diameter of the free margin of the wall 8.

In applying the ring 4 to a tire, after the member 2 has been placed in the position shown in Figs. 2 and 3, the ring is inserted between the free margin of the wall 8 of said member and the tire. In this operation the ring is contracted. Upon the release of the ring the resilience of the material causes the same to expand into substantially the position shown in Figs. 2 and 3 entirely about the tire thereby securing both itself and the member 2 in position on the tire. It will be noted that the ring, during its expansion, through the contact of its inclined outer margin with the correspondingly inclined free margin of the wall 8 of the member 2, exerts a cam action which forces the ring laterally against the tire and also tends to force the member 2 in the opposite direction thereby bringing the wall 6 of said member firmly into contact with the side of the tire.

In applying the tire cover to a tire, the member 2 is first passed laterally over the tire until the wall 6 engages the side of the tire. The split ring 4 is then inserted between the free margin of the wall 8 of the cover member 2 and the tire, the ring being contracted in placing the same in position. Upon the release of the ring, the ring expands into the position shown in Figs. 2 and 3, and in this position of the ring, the cover member 2 and the ring will be held firmly and securely in position on the tire. In removing the tire cover from a tire, the ring 4 its first contracted and disengaged from between the wall 8 of the member 2, and said member is then removed from the tire by withdrawing the same laterally therefrom.

In the construction shown, the tire cover is so constructed and formed that it has a very pleasing and attractive appearance, and the cover may be applied to and removed from the tire by simple, easy and convenient manual operation. The tire cover is simple in construction and is capable of manufacture in large quantities at a relatively low cost. The cover also furnishes a satisfactory protection for the tire to prevent the access of dust, dirt and water thereto.

It is to be understood that the invention is not limited to the particular construction and arrangement of parts of the illustrated embodiments of the invention, but that the invention may be embodied in other forms within the scope of the claims.

Having explained the nature and object of the invention and having specifically described certain constructions embodying the invention in its preferred forms, what is claimed is:

1. A tire cover construction comprising a tire engaging casing of relatively stiff sheet material formed to cover one side wall of a tire and to extend substantially across the tread of the tire and an expansible and contractible ring for engaging the said casing and the tire, arranged to expand by its own resilience into position to hold the casing in place on the tire.

2. A tire cover construction comprising an annular member made of relatively stiff sheet material and formed in cross-section to cover a side wall of a tire and to extend over the periphery thereof and a radially expansible and contractible ring for engaging between the peripheral portion of said member and the tire arranged to hold said member and itself in position on the tire by its expansion.

3. A tire cover construction comprising a cover formed with a side wall arranged to extend over one side of a tire and with a peripheral wall arranged to extend transversely over the peripheral portion of the tire and having an inwardly directed marginal portion inclined at an angle to the central plane of the tire and a resilient expansible and contractible split ring arranged to be inserted between the marginal portion of said peripheral wall and the tire and to expand through its own resilience into position to hold said cover and the ring in position on the tire, the ring having an outer marginal portion inclined to correspond with the inclination of said marginal portion of said peripheral wall, and with an inner marginal portion arranged to engage the side wall of the tire when the ring is in operating position.

4. A spare tire cover for protecting a spare tire mounted on a tire carrier comprising a circular dished shell sufficiently rigid to sustain itself against collapsing when disposed in a vertical position, including a side portion of circular shape to cover the outer side of the tire and a rim portion associated therewith and projecting over the outer periphery of the tire, and of sufficient length to extend around more than one-half of the outer perihpery of the tire, and substantially continuous circular expansible and contractible means having a yieldable freely sliding contact with the rear circumferential edge of said rim portion for causing said shell to be retained on the tire through engagement of said tire by said means to the rear of the median plane of the tire and inwardly of the outer periphery of the tire a distance sufficiently great to enable the cover to be retained on the tire against accidental displacement and yet not cover the rear side wall of the tire.

5. A spare tire cover for protecting a spare tire mounted on a tire carrier comprising a circular dished shell sufficiently rigid to sustain itself against collapsing when disposed in a vertical position, including a side portion of circular shape to cover the outer side of the tire and a rim portion associated therewith and projecting over the outer periphery of the tire, and of sufficient length to extend around more than one-half of the outer periphery of the tire, and substantially continuous circular expansible and contractible means having a transversely freely sliding contact with the rear circumferential edge of said rim portion for causing said shell to be retained on the tire through engagement of said tire by said means to the rear of the median plane of the tire and inwardly of the outer periphery of the tire a distance sufficiently great to enable the cover to be retained on the tire against accidental displacement and yet not cover the rear side wall of the tire, said latter means comprising a circular ring of shallow depth sufficient to enable the ring to have cover holding engagement with the tire at the rear side of the tire tread after the shell is on the tire.

6. A spare tire cover for protecting a spare tire mounted on a tire carrier comprising a circular dished shell sufficiently rigid to sustain itself against collapsing when disposed in a vertical position, including a side portion of circular shape to cover the outer side of the tire and a rim portion associated therewith and projecting over the outer periphery of the tire, and of sufficient length to extend around more than one-half of the outer periphery of the tire, and substantially continuous circular expansible and contractible means associated with the rear circumferential edge of said rim portion for causing said shell to be retained on the tire through engagement of said tire by said means to the rear of the median plane of the tire and inwardly of the outer periphery of the tire a distance sufficiently great to enable the cover to be retained on the tire against accidental displacement and yet not cover the rear side wall of the tire, said latter means being expansible into a yieldable sliding contact with said rear edge of the rim portion after the shell is shoved onto the tire.

7. In a multi-part tire cover, an arcuate section for disposition over a side of the tire and including a tread covering portion extending beyond the median plane of the tire and an arcuate retaining ring formed to telescope said portion to the rear of the median plane of the tire for retaining said portion in covering engagement with the tire said retaining ring having a freely and transversely sliding contact with the under side of said arcuate section so that the cover may accommodate slight variations in size and width of the tire.

8. In a multi-part tire cover, ar arcuate section for disposition over a side of the tire and including a tread covering portion extending beyond the median plane of the tire and an arcuate retaining ring formed to telescope said portion to the rear of the median plane of the tire for retaining said portion in covering engagement with the tire, said section and ring being provided with means for drawing them together in proper telescopic cooperation said ring and section being resiliently held in cooperation with each other and being held against lateral displacement from the tire solely by the engagement of the rear portion of the retaining ring with the rear of the tire.

9. In a multi-part tire cover, an arcuate section including side and tread covering portions, said tread covering portion being formed to be spaced from the tread of the tire and an arcuate retaining ring for disposition at the other side of the tire and to extend under said tread covering portion, said ring being of a lesser depth than that of said section and having an inwardly extending rear tire side covering portion yieldably engaging the tire to the rear of the median plane of the tire for adjusting the cover to variations in size and width of the tire.

10. In a multi-part spare tire cover, an arcuate ring including a portion for covering the exposed part of an outer side of the tire, as well as a tread covering portion, and an arcuate cover retaining ring of relatively lesser width than that of said arcuate ring for disposition over the tire tread between said tread covering portion and the rear side of the tire leaving the rear side of the tire substantially uncovered, said retaining ring having an inwardly extending rear edge for engaging the rear side of the tire tread to hold said arcuate ring against displacement from the tire, and a front edge formed to extend under said tread covering portion to have a transverse sliding contact therewith so that the retaining ring may accommodate slight variations in size and width of the tire.

11. In a multi-part spare tire cover, an arcuate ring including a portion for covering the exposed part of an outer side of the tire, as well as a tread covering portion, and an arcuate cover retaining ring of relatively lesser width than that of said arcuate ring for disposition over the tire tread between said tread covering portion and the rear side of the tire leaving the rear side of the tire substantially uncovered, said retaining ring having an inwardly extending rear edge for engaging the rear side of the tire tread to hold said arcuate ring against displacement from the tire, and a front edge formed to extend under said tread covering portion to have a transverse sliding contact therewith so that the retaining ring may accommodate slight variations in size and width of the tire, said retaining ring being resiliently urged into said sliding contact with said arcuate ring to provide a transversely yieldable and sliding connection between said rings.

12. In a non-collapsible spare tire cover front and rear telescoping arcuate and transversely curved sections, each having a tread covering portion and a tire side covering portion with the side covering portion of said rear section of a lesser depth than that of the other side covering portion, said sections being provided with means to cause them to be resiliently and bodily urged into a freely and transversely sliding fit on the tire for adjusting the cover to variations in size and width of the tire.

13. In a non-collapsible spare tire cover front and rear arcuate and transversely curved sections, each having a tread covering portion and a tire side covering portion with the side covering portion of said rear section of a lesser depth than that of the other side covering portion, said rear section comprising an expansible and contractible split ring having a freely and transversely sliding fit with the tread covering portion of said front section and exerting a resilient cover clamping pressure on the tire for adjusting the cover to variations in size and width of the tire.

14. In a non-collapsible spare tire cover front and rear arcuate and transversely curved sections, each having a tread covering portion and a tire side covering portion with the side covering portion of said rear section of a lesser depth than that of the other side covering portion, said rear section comprising an expansible and contractible split ring having a freely and transversely sliding fit with the tread covering portion of said front section and exerting a cover clamping pressure on the tire for adjusting the cover to variations in size and width of the tire.

GEORGE ALBERT LYON.

CERTIFICATE OF CORRECTION.

Patent No. 1,924,085.  August 22, 1933.

GEORGE ALBERT LYON.

It is hereby certified that error appears in the printed specification of the above numbered patent requiring correction as follows: Page 2, line 108, claim 4, strike out the words "one-half of" and insert instead the syllable and word jecting over; and line 110, for "perihpery" read periphery; and that the said Letters Patent should be read with these corrections therein that the same may conform to the record of the case in the Patent Office.

Signed and sealed this 15th day of May, A. D. 1934.

Bryan M. Battey (Seal)  Acting Commissioner of Patents.